United States Patent
Nakayama et al.

(10) Patent No.: US 9,233,337 B2
(45) Date of Patent: Jan. 12, 2016

(54) $CO_2$ RECOVERY DEVICE

(71) Applicant: MITSUBISHI HEAVY INDUSTRIES, LTD., Tokyo (JP)

(72) Inventors: Koji Nakayama, New York, NY (US); Takahito Yonekawa, New York, NY (US); Masayuki Inui, New York, NY (US); Tatsuya Tsujiuchi, New York, NY (US); Osamu Miyamoto, Hiroshima (JP); Yoshiki Sorimachi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 338 days.

(21) Appl. No.: 13/623,448

(22) Filed: Sep. 20, 2012

(65) Prior Publication Data

US 2014/0076165 A1    Mar. 20, 2014

(51) Int. Cl.
*B01D 53/14* (2006.01)
*B01D 53/62* (2006.01)
*B01D 53/78* (2006.01)

(52) U.S. Cl.
CPC ........ *B01D 53/1425* (2013.01); *B01D 53/1475* (2013.01); *B01D 53/62* (2013.01); *B01D 53/78* (2013.01); *B01D 2252/204* (2013.01); *B01D 2257/504* (2013.01); *B01D 2258/0283* (2013.01); *Y02C 10/04* (2013.01); *Y02C 10/06* (2013.01)

(58) Field of Classification Search
CPC ............... B01D 53/14; B01D 53/1425; B01D 53/1475; Y02C 10/06
USPC ........................................................ 96/185
See application file for complete search history.

(56) References Cited

U.S. PATENT DOCUMENTS

2011/0107916 A1*  5/2011  Inoue et al. ..................... 96/242

FOREIGN PATENT DOCUMENTS

| JP | 2007-284273 A |   | 11/2007 |
|----|---------------|---|---------|
| JP | 2007284273 A  | * | 11/2007 |
| JP | 2010-22986 A  |   | 2/2010  |
| JP | 2011-162383 A |   | 8/2011  |
| JP | 2011-218287 A |   | 11/2011 |

OTHER PUBLICATIONS

Written Opinion dated Dec. 3, 2013, issued in corresponding International Application No. PCT/JP2013/075197 with English translation (13 pages).

* cited by examiner

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

A regeneration tower 7 of a $CO_2$ recovery unit includes an upper regeneration portion 51 that has a tray portion 45, a lower regeneration portion 52 provided below the upper regeneration portion 51 and having a liquid dispersion portion 46, and a supply line $L_5$ that supplies absorbing liquid stored in the tray portion 45 to the liquid dispersion portion 46. The supply line $L_5$ is provided with a heat exchanger 53, and the absorbing liquid is circulated using the density difference between the absorbing liquid flowing before the heat exchanger 53 and the absorbing liquid flowing after the heat exchanger 53 as a driving force. This reduces the cost of equipment while reducing the power in the delivery of the absorbing liquid in the regeneration portion.

4 Claims, 3 Drawing Sheets

CO₂ RECOVERY DEVICE

TECHNICAL FIELD

The present invention relates to a $CO_2$ recovery unit that allows absorbing liquid to absorb $CO_2$ to eliminate $CO_2$ included in exhaust gas and allows the absorbing liquid that absorbed $CO_2$ to discharge $CO_2$ while regenerating the absorbing liquid.

BACKGROUND ART

The $CO_2$ recovery unit recovers carbon dioxide ($CO_2$) that is generated when fossil fuel is burned at a thermal power plant etc. The $CO_2$ recovery unit allows amine compound solution (hereinafter, referred to as "absorbing liquid") to contact with combustion exhaust gas discharged from a boiler to eliminate $CO_2$ included in the combustion exhaust gas, and stores $CO_2$ without discharging it to the ambient air.

The $CO_2$ recovery unit includes an absorbing tower that allows the combustion exhaust gas with the absorbing liquid and a regeneration tower that heats the absorbing liquid that absorbed $CO_2$ to eliminate $CO_2$ while regenerating the absorbing liquid. The regenerated absorbing liquid is delivered to the absorbing tower and reused.

CITATION LIST

Patent Literature

{PTL 1}
Japanese Unexamined Patent Application, Publication No. 2007-284273 (paragraphs [0036] to [0039] etc.)

SUMMARY OF INVENTION

Technical Problem

The regeneration tower of the $CO_2$ recovery unit houses a regeneration portion that includes a liquid dispersion portion that descends the absorbing liquid that absorbed $CO_2$ (hereinafter, referred to as "rich absorbing liquid"), a packing layer that contacts the absorbing liquid that descends from the liquid dispersion portion with steam countercurrently for heating and a tray portion that stores the absorbing liquid (hereinafter, referred to as "semi-lean absorbing liquid") that partially includes the absorbing liquid in which $CO_2$ is eliminated (hereinafter, referred to as "lean absorbing liquid").

There is a case that a plurality of stages of regeneration portions is placed (for example, two or three stages etc.) in the regeneration tower. The absorbing liquid stored in the tray portion on the upper regeneration portion is heated by passing through a heat exchanger and supplied to the lower regeneration portion via the liquid dispersion portion. This allows the absorbing liquid to be regenerated efficiently. Patent Literature 1 discloses that three stages of packing layers is configured in the regeneration tower, and for example, a reflux line that extracts the semi-lean solution in which $CO_2$ is partially eliminated in the regeneration tower from the upstream side of the regeneration tower to return it to the downstream side is provided and a heat exchanger that heats the semi-lean solution in the reflux line is provided.

Conventionally, when absorbing liquid stored in the tray portion on the upper regeneration portion is delivered to the lower regeneration portion, pressure increase by a pump or adjustment of a flow rate by a flow rate adjustment valve have been performed. However, in such a case, to place the pump or the flow rate adjustment valve, the configuration of the $CO_2$ recovery unit becomes complex and the cost of equipment becomes higher, and moreover, due to power consumption caused by the power (driving of the pump), the cost is increased.

The present invention is made considering these circumstances, and an object of the present invention is to provide a $CO_2$ recovery unit that can reduce the power while reducing the cost of equipment in the delivery of the absorbing liquid in the regeneration portion.

Solution to Problem

In order to solve the above problem, a $CO_2$ recovery unit according to the present invention adopts the following means.

That is, the $CO_2$ recovery unit according to the present invention is a $CO_2$ recovery unit including: an absorbing tower that allows absorbing liquid to absorb $CO_2$ in exhaust gas; and a regeneration tower that allows the absorbing liquid that absorbed $CO_2$ in the absorbing tower to discharge $CO_2$, wherein the absorbing liquid that discharged $CO_2$ in the regeneration tower is reused in the absorbing tower, wherein the regeneration tower includes: a first regeneration portion having a tray portion that stores the absorbing liquid; a second regeneration portion provided below the first regeneration portion and having a liquid dispersion portion that supplies the absorbing liquid; and a supply pipe that connects the tray portion and the liquid dispersion portion to supply the absorbing liquid stored in the tray portion to the liquid dispersion portion, wherein the supply pipe includes a heating portion that heats the absorbing liquid to circulate the absorbing liquid using a density difference between the absorbing liquid flowing before the heating portion and the absorbing liquid flowing after the heating portion as a driving force.

According to this configuration, the first regeneration portion and the second regeneration portion are sequentially provided in the vertical direction in the regeneration tower, and the absorbing liquid is introduced from the tray portion placed below the first generation portion to the liquid dispersion portion placed above the second regeneration portion via the supply pipe. Since the absorbing liquid that passed through the supply pipe is heated by the heating portion, $CO_2$ in the absorbing liquid becomes partially gaseous, which provides a density difference between the absorbing liquid before the heating portion and that after the heating portion, whereby a thermosiphon effect can be obtained. As a result, even when pressure loss occurs in the heating portion or a hydraulic head difference exists by delivering the absorbing liquid to the piping disposed on a higher position and the like, the absorbing liquid can be supplied without providing a pumping device such as a pump. The heating portion is a heat exchanger, for example.

In the above invention, the supply pipe preferably does not have a pumping device that pumps the absorbing liquid or a control portion that controls a flow rate of the absorbing liquid. With this configuration, the configuration of a heat recovery system can be simplified, no cost of equipment is needed and power consumption due to the power (driving force of a pump) can be lowered.

In the above invention, a hydraulic head difference caused by pressure loss in the piping and the heating portion relative to the liquid dispersion portion of the second regeneration portion is equal to or larger than a height difference between the tray portion and the liquid dispersion portion.

When the hydraulic head difference caused by pressure loss in the piping and the heating portion relative to the liquid dispersion portion is smaller than the height difference between the tray portion and the liquid dispersion portion, the absorbing liquid is introduced from the tray portion to the liquid dispersion portion due to the height difference via the piping. On the other hand, when the hydraulic head difference caused by pressure loss in the piping and the heating portion relative to the liquid dispersion portion is equal to or larger than the height difference between the tray portion and the liquid dispersion portion, the absorbing liquid cannot be introduced from the tray portion to the liquid dispersion portion only by the height difference unless the absorbing liquid is heated by the heating portion. With this configuration, in the absorbing liquid that passes through the supply pipe, $CO_2$ in the absorbing liquid becomes partially gaseous by the heating portion, which provides a density difference between the absorbing liquid before the heating portion and that after the heating portion, whereby a thermosiphon effect can be obtained. Because of this, even when the hydraulic head difference caused by pressure loss in the piping and the heating portion relative to the liquid dispersion portion is equal to or larger than the height difference between the tray portion and the liquid dispersion portion, the absorbing liquid can be supplied to the liquid dispersion portion without providing a pumping device such as a pump.

In the above invention, a driving force for circulating the absorbing liquid is generated by gaseous $CO_2$ and steam generated from the absorbing liquid in the heating portion.

With this configuration, the driving force for circulating the absorbing liquid is generated by gaseous $CO_2$ and stream generated from the absorbing liquid in the heating portion.

In the above invention, the supply pipe desirably does not include a section where gas accumulates.

With this configuration, since no section where gas accumulates is provided in the supply pipe, the absorbing liquid is not blocked by the accumulated gas and is smoothly introduced from the tray portion to the liquid dispersion portion.

Advantageous Effects of Invention

According to the present invention, when the absorbing liquid that passes through the supply pipe is heated in the heating portion, $CO_2$ in the absorbing liquid becomes partially gaseous, which provides the density difference between the absorbing liquid before the heating portion and that after the heating portion, whereby thermosiphon effect can be obtained. As a result, the absorbing liquid can be delivered without providing a pumping device that pumps the absorbing liquid, so that the power can be lowered while the cost of equipment can be reduced.

DESCRIPTION OF EMBODIMENTS

Hereinafter, a $CO_2$ (carbon dioxide) recovery unit 1 according to one embodiment of the present invention will be explained with reference to the drawings.

Figure 2:
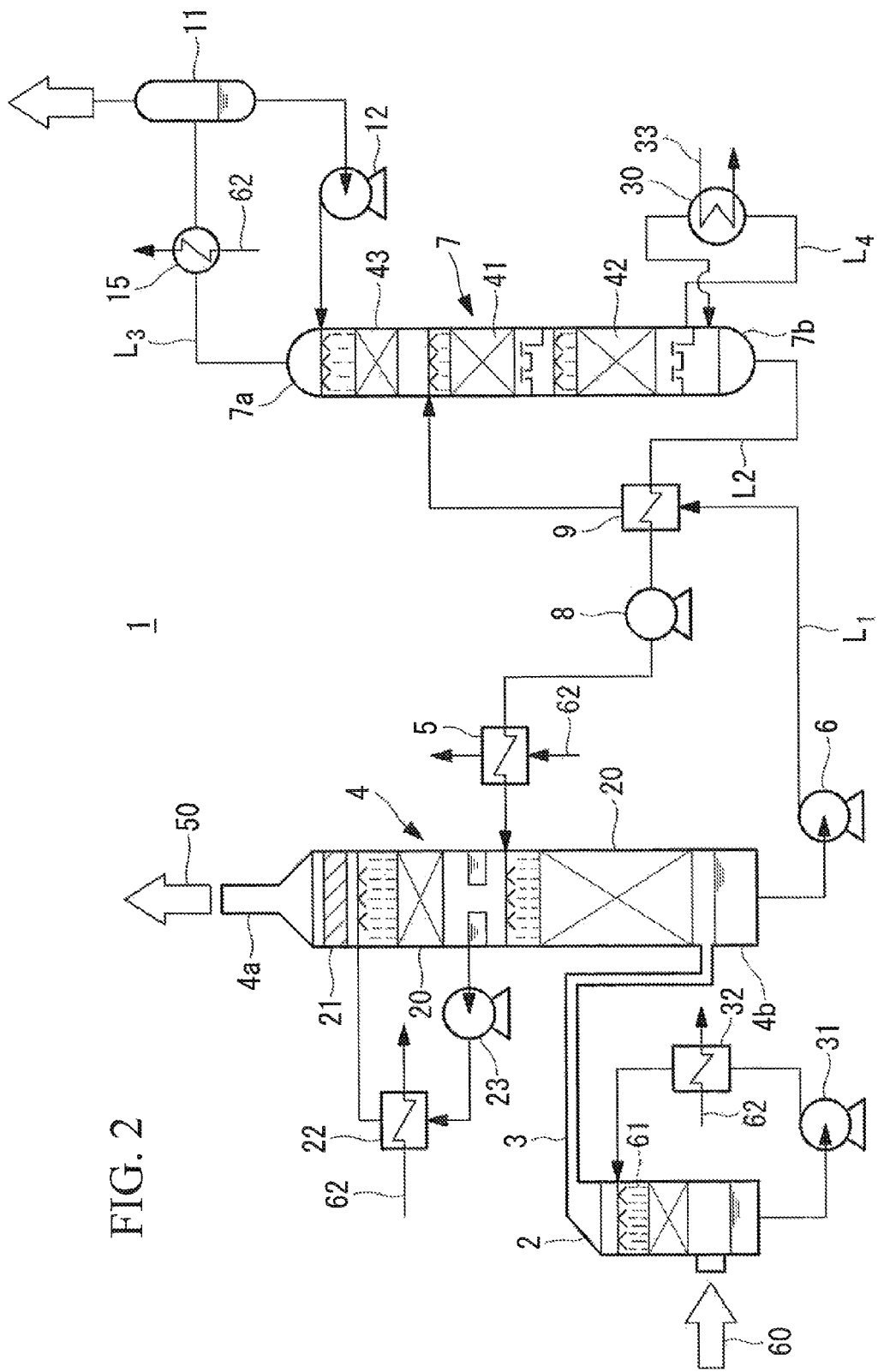
FIG. 2 is a schematic view showing a regeneration tower of the $CO_2$ recovery unit according to one embodiment of the present invention.

First, the configuration and an operation of the $CO_2$ recovery unit according to this embodiment will be explained with reference to FIG. 2.

The $CO_2$ recovery unit 1 recovers carbon dioxide ($CO_2$) that is generated when fossil fuel is burned at a thermal power plant etc. The $CO_2$ recovery unit 1 allows amine compound solution (hereinafter, referred to as "absorbing liquid") to contact with combustion exhaust gas 60 discharged from a boiler or a gas turbine (not shown) to eliminate $CO_2$ included in the combustion exhaust gas 60, and stores $CO_2$ without discharging it to the ambient air.

The $CO_2$ recovery unit 1 includes an absorbing tower 4 that allows the exhaust gas 60 with the absorbing liquid and a regeneration tower 7 that heats the absorbing liquid that absorbed $CO_2$ to eliminate $CO_2$ while regenerating the absorbing liquid. The regenerated absorbing liquid is delivered to the absorbing tower 4 and reused.

In the $CO_2$ recovery unit 1, the exhaust gas 60 including $CO_2$ discharged from the boiler or the gas turbine (not shown) placed in the thermal power plane etc. is delivered to a cooling tower 2 by a blower (not shown). The exhaust gas 60 supplied to the cooling tower 2 is cooled by circulation cooling water 61. The circulation cooling water 61 used to cool the exhaust gas 60 passes through a cooler 32 to be delivered to the cooling tower 2 again by a pump 31, and is sprayed in the tower. Additionally, in the cooler 32, cooling water 62 to cool the circulation cooling water 61 which is supplied to the cooling tower 2 is used.

The exhaust gas 60 including the cooled $CO_2$ is supplied to a lower portion of the absorbing tower 4 via an exhaust gas line 3. The absorbing liquid is supplied from an upper portion of the absorbing tower 4 to a lower packing layer 20. In the absorbing tower 4, the absorbing liquid is countercurrently contacted with the exhaust gas 60 while it passes through the packing layer 20. By doing this, $CO_2$ in the exhaust gas 60 is absorbed in the absorbing liquid and $CO_2$ is eliminated from the exhaust gas 60. Here, the exhaust gas 60 in which $CO_2$ is eliminated is called as purged gas 50. This purged gas 50 in which $CO_2$ is eliminated is discharged from a tower top portion 4a of the absorbing tower 4.

Since $CO_2$ is absorbed in the absorbing liquid, the absorbing liquid produces heat and the liquid temperature is increased, so that the purged gas 50 can include water vapor etc. The water vapor in the purged gas 50 is condensed by cooling when it is countercurrently contacted with cooling water on an upper packing layer 20 of the absorbing tower 4. A mist eliminator 21 is provided above the packing layer 20 to collect mist in the purged gas 50. On the outside of the absorbing tower 4, a cooler 22 and a pump 23 that circulates a part of the condensed water between the cooler 22 and the absorbing tower 4 are provided.

The absorbing liquid that absorbed $CO_2$ in the absorbing tower 4 (hereinafter, referred to as "rich absorbing liquid") is stored in the tower bottom portion 4b. The rich absorbing liquid is supplied to the regeneration tower 7 by a pump 6 via a liquid sending line $L_1$ connecting the tower bottom portion 4b of the absorbing tower 4 and an upper portion of the regeneration tower 7. In the regeneration tower 7, the rich absorbing liquid is sprayed to a packing layer 41.

In the liquid sending line $L_1$, on an intersection with a liquid sending line $L_2$, a heat exchanger 9 that executes heat exchange between the rich absorbing liquid and the absorbing liquid in which $CO_2$ is eliminated in the regeneration tower 7 (hereinafter, referred to as "lean absorbing liquid") is provided. In the heat exchanger 9, the rich absorbing liquid flowing in the liquid sending line $L_1$ is heated, and the lean absorbing liquid flowing in the liquid sending line $L_2$ is cooled.

In the regeneration tower 7, the rich absorbing liquid is countercurrently contacted with hot steam during it passes through the packing layers 41, 42, and $CO_2$ is discharged by endothermic reaction. Until the absorbing liquid reaches the tower bottom portion 7b of the regeneration tower 7, most $CO_2$ is eliminated, and the absorbing liquid is regenerated as the lean absorbing liquid. The regenerated lean absorbing liquid is pumped by a pump 8 via the liquid sending line $L_2$, and cooled while passing through the heat exchanger 9 and the cooler 5. Because of this, the lean absorbing liquid is fully cooled to the temperature that is suitable for $CO_2$ absorption in the absorbing tower 4. Thereafter, the lean absorbing liquid is supplied above the lower packing layer 20 of the absorbing tower 4 again to be reused.

A $CO_2$ discharge line $L_3$ connects a tower top portion 7a of the regeneration tower 7 and a gas-liquid separator 11. The $CO_2$ discharged from the absorbing liquid in the regeneration tower 7 passes through the $CO_2$ discharge line $L_3$, and after it is fully cooled via a cooler 15 using cooling water 62, it is sent to the gas-liquid separator 11. The $CO_2$ to be sent to the gas-liquid separator 11 includes water, and is separated into $CO_2$ and condensed water in the gas-liquid separator 11. The $CO_2$ from which water is separated is supplied to a $CO_2$ compression device (not shown). After that, the recovered $CO_2$ is compressed by the $CO_2$ compression device to become high-pressure $CO_2$. The condensed water collected in the gas-liquid separator 11 is refluxed to an upper portion of the regeneration tower 7 by a pump 12. The refluxed condensed water cools a condensation portion 43 provided in the regeneration tower 7. This prevents the discharge of the absorbing liquid etc. from the regeneration tower 7.

On a tower bottom portion 7b of the regeneration tower 7, a circulation line $L_4$ that circulates the lean absorbing liquid to the outside of the tower is provided, and a reboiler 30 is provided on the circulation line $L_4$. The reboiler 30 heats the lean absorbing liquid by hot stream supplied by a stream pipe 33. A part of the absorbing liquid of the tower bottom portion 7b is supplied to the reboiler 30 via the circulation line $L_4$, and after it is heated by heat exchange with hot steam, it is refluxed to the regeneration tower 7. By this heating, $CO_2$ is discharged from the absorbing liquid of the tower bottom portion 7b. Moreover, since the regeneration tower 7 has a high temperature, the packing layers 41, 42 are indirectly heated, which encourages the discharge of $CO_2$ from the absorbing liquid.

Figure 1:
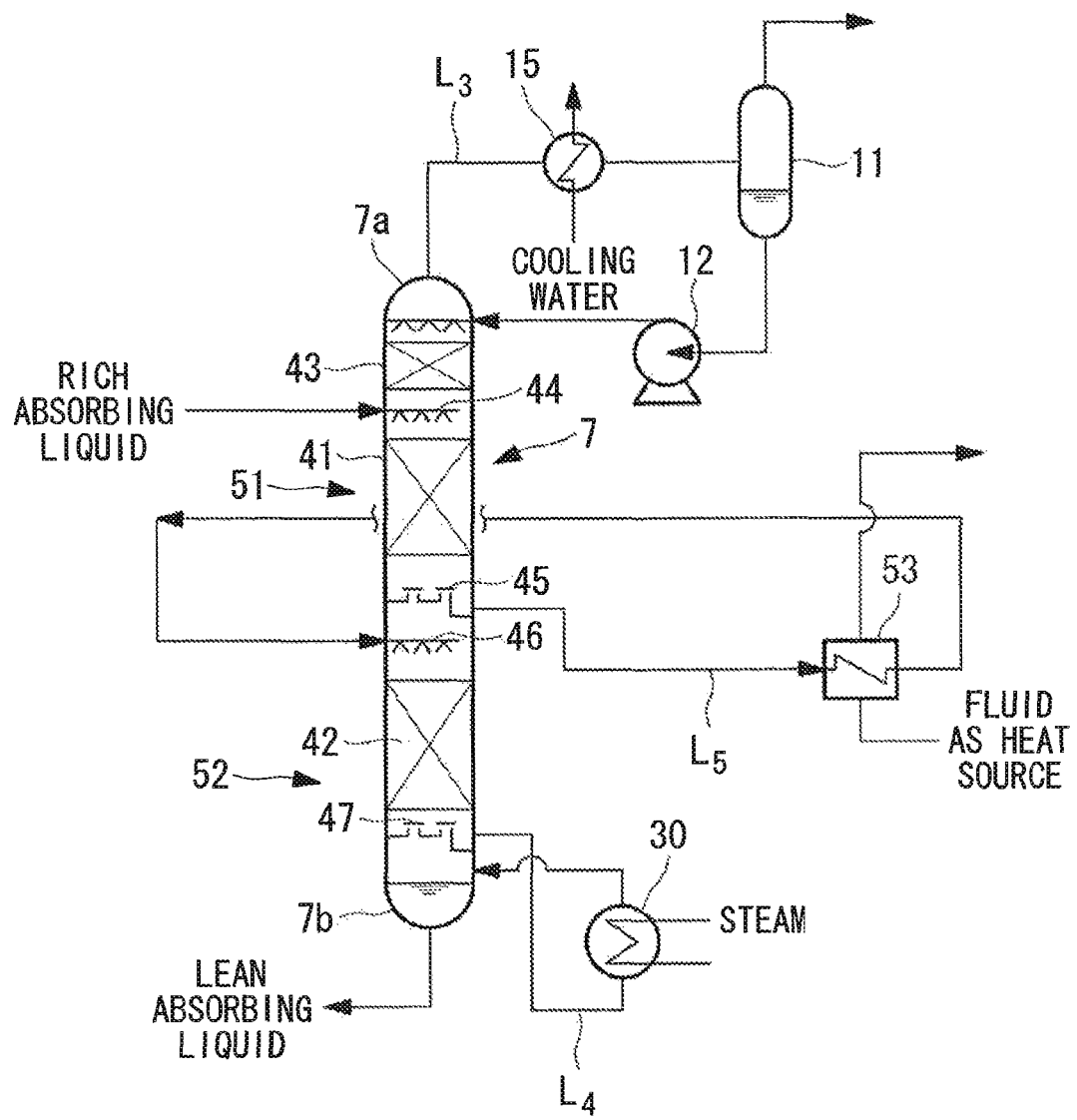
FIG. 1 is a schematic view showing a $CO_2$ recovery unit according to one embodiment of the present invention.

Next, with reference to FIG. 1, the configuration and an operation of the regeneration tower 7 of the $CO_2$ recovery unit 1 according to this embodiment will be explained.

In the regeneration tower 7, a portion in which the absorbing liquid is heated and regenerated is divided into an upper regeneration portion 51 and a lower regeneration portion 52.

The upper regeneration portion 51 includes a liquid dispersion portion 44, the packing layer 41 and a tray portion 45. The liquid dispersion portion 44 is provided above the packing layer 41, and supplies the rich absorbing liquid to the packing layer 41. The tray portion 45 is provided below the packing layer 41, and is constituted by, for example, a chimney tray and a seal pan.

The rich absorbing liquid introduced from the liquid dispersion portion 44 of the upper regeneration portion 51 contacts with hot steam ascending from below while it flows down in the packing layer 41, and discharges $CO_2$ by endothermic reaction. The absorbing liquid that discharged $CO_2$ drops on the chimney tray of the tray portion 45, and is collected in the seal pan to be stored. The absorbing liquid stored in the seal pan of the tray portion 45 is supplied to a supply line $L_5$.

Similar to the upper regeneration portion 51, the lower regeneration portion 52 includes a liquid dispersion portion 46, the packing layer 42 and a tray portion 47. The liquid dispersion portion 46 is provided above the packing layer 42 and supplies the absorbing liquid introduced from the supply line $L_5$ to the packing layer 42. The tray portion 47 is provided below the packing layer 42, and is constituted by, for example, a chimney tray and a seal pan.

The semi-lean absorbing liquid introduced from the liquid dispersion portion 46 of the lower regeneration portion 52 contacts with hot steam ascending from below while it flows down in the packing layer 42, and discharges $CO_2$ by endothermic reaction. The absorbing liquid that discharged $CO_2$ drops on the chimney tray of the tray portion 47 and collected on the seal pan to be stored. A part of the lean absorbing liquid stored on the seal pan of the tray portion 47 is supplied to the circulation line $L_4$ described above.

The lean absorbing liquid supplied to the circulation line $L_4$ is heated by the reboiler 30, and introduced below the tray portion 47 of the lower regeneration portion 52 of the regeneration tower 7 to be stored in the tower bottom portion 7b of the regeneration tower 7. In addition, the absorbing liquid generates steam by heating, and the generated steam passes through the chimney trays of the tray portions 47, 45 and ascends in the regeneration tower 7.

Next, the supply line $L_5$ of the absorbing liquid provided on the regeneration tower 7 will be explained.

The supply line $L_5$ has one end connected to the tray portion 45 of the upper regeneration portion 51 and the other end connected to the liquid dispersion portion 46 of the lower regeneration portion 52. A heat exchanger 53 is provided on the supply line $L_5$. In the heat exchanger 53, fluid as a heat source is supplied, and heat exchange is executed between the fluid as a heat source and the absorbing liquid flowing in the supply line $L_5$. As a result, the absorbing liquid flowing in the supply line $L_5$ is heated. As the fluid as a heat source passing through the heat exchanger 53, the lean absorbing liquid, the steam condensed water, the exhaust gas, $CO_2$ and the like in the $CO_2$ recovery unit 1 can be listed.

The supply line $L_5$ is semi-closed space which is closed other than a connecting portion with the tray portion 45 of the upper regeneration portion 51 and the liquid dispersion portion 46 of the lower regeneration portion 52. The liquid dispersion portion 46 of the lower regeneration portion 52 is positioned lower than the connecting portion with the tray portion 45 of the upper regeneration portion 51. Moreover, piping of the supply line $L_5$ or the heat exchanger 53 partially includes a portion disposed higher than the liquid level of the absorbing liquid stored in the seal pan of the tray portion 45. That is, the hydraulic head difference caused by pressure loss in piping and the heat exchanger 53 relative to the liquid dispersion portion 46 of the lower regeneration portion 52 is equal to or larger than the height difference between the tray portion 45 and the liquid dispersion portion 46.

In the supply line $L_5$, a portion heated by the heat exchanger 53 is maintained at a higher temperature than that on the side of the regeneration tower 7. The absorbing liquid stored in the seal pan of the tray portion 45 of the upper regeneration portion 51 is supplied to the supply line $L_5$ and heated in the heat exchanger 53. In the absorbing liquid, $CO_2$ becomes partially gaseous when the temperature is increased in the heat exchanger 53. Consequently, the heated absorbing liquid has the smaller density compared to the pre-heating state before passing through the heat exchanger 53, and when the absorbing liquid exits the heat exchanger 53, it ascends to a higher position than the heat exchanger 53 in the supply line $L_5$. Thereafter, along the pipe line of the supply line $L_5$, the absorbing liquid is supplied to the liquid dispersion portion 46 of the lower regeneration portion 52.

As described above, according to this embodiment, the absorbing liquid is heated in the heat exchanger 53 and $CO_2$ in the absorbing liquid becomes partially gaseous by the heating, which generates density difference between on the upstream side and the downstream side of the heat exchanger 53. Accordingly, even when there exists a higher portion than an extraction position of the upper regeneration portion 51 of the regeneration tower 7 in the piping or the heat exchanger 53 of the supply line $L_5$, the supply line $L_5$ can supply the absorbing liquid to a higher portion without using the pump, and eventually, it can introduce the absorbing liquid to the liquid dispersion portion 46 of the lower regeneration portion 52 of the regeneration tower 7.

Figure 3:
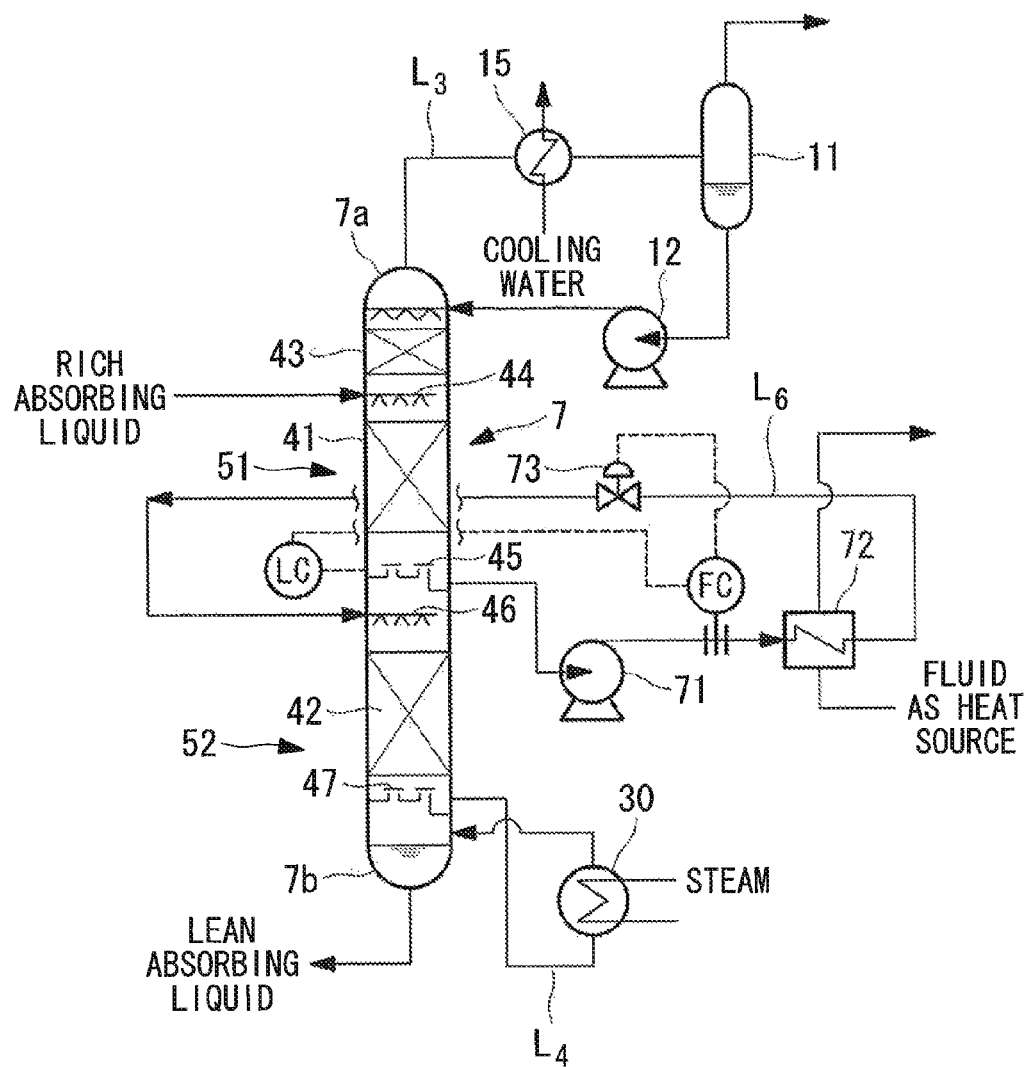
FIG. 3 is a schematic view showing a regeneration tower of the conventional $CO_2$ recovery unit.

Thus, in this embodiment, unlike the conventional $CO_2$ recovery unit as shown in FIG. 3, a pump 71 that increases the pressure of the absorbing liquid or a flow rate adjustment valve 73 that adjusts the flow rate of the absorbing liquid whose pressure is increased is unnecessary, which reduces the cost of equipment and the electric energy caused by the power.

Conventionally, in a supply line $L_6$ connecting the tray portion 45 of the upper regeneration portion 51 and the liquid dispersion portion 46 of the lower regeneration portion 52, in order to pass the absorbing liquid through a heat exchanger 72 and deliver the absorbing liquid to piping located on a higher portion, considering the pressure loss and the hydraulic head difference, the pump 71 has been deemed to be necessary. However, when the $CO_2$ recovery unit is actually operated, it is found that the supply line connecting the tray portion 45 of the upper regeneration portion 51 and the liquid dispersion portion 46 of the lower regeneration portion 52 of the regeneration tower 7 can deliver the absorbing liquid without any power. The reason of the delivery of $CO_2$ without any power is that $CO_2$ of the absorbing liquid becomes partially gaseous due to heating by the heat exchanger 53 to generate density difference between the absorbing liquid before the heat exchanger 53 and that after the heat exchanger 53, whereby a thermosiphon effect can be obtained. Accordingly, in this embodiment, when the absorbing liquid is supplied from the tray portion 45 of the upper regeneration portion 51 to the liquid dispersion portion 46 of the lower regeneration portion 52 via the heat exchanger 53, the absorbing liquid is supplied without providing the pump 71.

After being heated in the heat exchanger 53, the absorbing liquid to be delivered in the supply line $L_5$ includes gaseous $CO_2$, so that when a pocket-shaped expansive bent pipe or a swivel joint is formed on the pipe line in the height direction, gas could be accumulated. In the supply line $L_5$ according to this embodiment, the pipe line is formed not to include a section where gas accumulates. For example, by forming a pocket-shaped pipe line in the horizontal direction or by applying the configuration that absorbs expansion of the piping without forming the pocket-shaped pipe line or forming the pipe line in which absorption of the expansion of the piping is unnecessary, gas accumulation in the piping can be prevented. As a result, the absorbing liquid cannot be blocked by the accumulated gas, and is smoothly introduced from the tray portion 45 to the liquid dispersion portion 46.

Additionally, while the case where the regeneration portion is divided into two is explained in this embodiment, the present invention is not limited to this example. For example, the regeneration portion can be divided into three parts of an upper regeneration portion, a middle regeneration portion and a lower regeneration portion, or it can be divided into four parts or more. Even in this case, the supply line $L_5$ can be placed between vertically adjacent regeneration portions.

REFERENCE SIGNS LIST

1 $CO_2$ recovery unit
4 absorbing tower
7 regeneration tower
11 gas-liquid separator
20 packing layer
21 mist eliminator
30 reboiler
41, 42 packing layer
43 condensation portion
44, 46 liquid dispersion portion
45, 47 tray portion
51 upper regeneration portion (first regeneration portion)
52 lower regeneration portion (second regeneration portion)
53 heat exchanger (heating portion)
71 pump
72 heat exchanger
73 flow rate adjustment valve
$L_1$, $L_2$ liquid sending line
$L_3$ $CO_2$ discharge line
$L_4$ circulation line
$L_5$ supply line (supply pipe)
$L_6$ supply line

The invention claimed is:

1. A $CO_2$ recovery unit comprising:
an absorbing tower that allows absorbing liquid to absorb $CO_2$ in exhaust gas; and
a regeneration tower that allows the absorbing liquid that absorbed $CO_2$ in the absorbing tower to discharge $CO_2$,
wherein the absorbing liquid that discharged $CO_2$ in the regeneration tower is reused in the absorbing tower,
wherein the regeneration tower includes:
a first regeneration portion having a first packing layer in which the absorbing liquid that has absorbed $CO_2$ comes in contact with steam to heat the absorbing liquid and a first tray portion that stores the absorbing liquid that has passed the first packing layer;
a second regeneration portion provided below the first regeneration portion and having a second tray portion, a second packing layer in which the absorbing liquid that has passed the first regeneration portion comes in contact with steam to heat the absorbing liquid, and a liquid dispersion portion that supplies the second packing layer with the absorbing liquid that has passed the first regeneration portion;
a first supply pipe that connects the first tray portion and the liquid dispersion portion to supply the absorbing liquid stored in the first tray portion to the liquid dispersion portion;
a second supply pipe that connects the second tray portion and a part below the second tray portion to supply the absorbing liquid stored in the second tray portion to the part below the second tray portion; and
a reboiler that is provided on the second supply pipe and that is adapted to produce steam by heating the absorbing liquid; and
a heating portion is adapted to produce gaseous CO2 and steam by heating the absorbing liquid,
wherein the first supply pipe includes the heating portion that heats the absorbing liquid to circulate the absorbing liquid using a density difference between the absorbing liquid flowing before the heating portion and the absorbing liquid flowing after the heating portion as a driving force, and wherein the driving force for circulating the absorbing liquid is generated by the gaseous CO2 and steam generated from the absorbing liquid in the heating portion.

2. The $CO_2$ recovery unit according to claim 1, wherein the supply pipe does not have a pumping device that pumps the absorbing liquid or a control portion other than the supply pipe itself that controls a flow rate of the absorbing liquid.

3. The $CO_2$ recovery unit according to claim 1, wherein a hydraulic head difference caused by pressure loss in the supply pipe and the heating portion relative to the liquid dispersion portion of the second regeneration portion is equal to or larger than a height difference between the tray portion and the liquid dispersion portion.

4. The $CO_2$ recovery unit according to claim 1, wherein the supply pipe does not include a section where gas accumulates.

* * * * *